United States Patent
Tessnow et al.

(10) Patent No.: US 8,905,609 B2
(45) Date of Patent: Dec. 9, 2014

(54) LIGHTING SYSTEM WITH SHUTTER, REFLECTOR, PRIMARY LIGHT ENGINE AND A SECONDARY LIGHT ENGINE COUPLED TO SHUTTER

(75) Inventors: Thomas Tessnow, Weare, NH (US); Michael D. Tucker, Henniker, NH (US)

(73) Assignee: OSRAM SYLVANIA Inc., Danvers, MA (US)

( * ) Notice: Subject to any disclaimer, the term of this patent is extended or adjusted under 35 U.S.C. 154(b) by 260 days.

(21) Appl. No.: 12/924,587

(22) Filed: Sep. 30, 2010

(65) Prior Publication Data
US 2012/0081902 A1 Apr. 5, 2012

(51) Int. Cl.
F21V 11/00 (2006.01)
F21S 8/10 (2006.01)
B60Q 1/00 (2006.01)
B60Q 1/28 (2006.01)

(52) U.S. Cl.
CPC ............. *F21S 48/125* (2013.01); *B60Q 1/0058* (2013.01); *B60Q 1/28* (2013.01); *F21S 48/1154* (2013.01); *F21S 48/1159* (2013.01); *F21S 48/1186* (2013.01); *F21S 48/1195* (2013.01); *F21S 48/1742* (2013.01); *F21S 48/1757* (2013.01); *F21S 48/1778* (2013.01); *B60Q 2400/30* (2013.01)
USPC ............ 362/539; 362/538; 362/543; 362/544

(58) Field of Classification Search
USPC ......... 362/539, 543, 512–513, 277, 279–284, 362/544–545, 520–522
See application file for complete search history.

(56) References Cited

U.S. PATENT DOCUMENTS

| 1,235,752 | A | * | 8/1917 | Ames ............................. 362/538 |
| 6,467,940 | B2 | | 10/2002 | Eschler et al. |
| 6,578,997 | B2 | * | 6/2003 | Futami .......................... 362/522 |
| 6,607,295 | B2 | * | 8/2003 | Hayakawa .................... 362/517 |
| 6,976,772 | B2 | | 12/2005 | Albou et al. |
| 7,201,504 | B2 | * | 4/2007 | Collot et al. .................. 362/538 |
| 7,316,492 | B2 | | 1/2008 | Yamamura et al. |
| 7,367,693 | B2 | * | 5/2008 | Tsukamoto et al. .......... 362/308 |

(Continued)

FOREIGN PATENT DOCUMENTS

DE 10347951 A1 5/2005
WO WO 2007025637 A1 * 3/2007

OTHER PUBLICATIONS

Automotive Lighting; "Automotive Lighting Moves Boundaries to Add Value to Safety."; internet; Sep. 15, 2009; 2 pages; Reutlingen, Germany.

(Continued)

*Primary Examiner* — Robert May
(74) *Attorney, Agent, or Firm* — Edward S. Podszus

(57) ABSTRACT

A lighting system (10) comprising a primary light engine (20); a secondary light engine (22); and a projection apparatus (14, 14*a-b*) comprising a reflector (28) configured to reflect electromagnetic radiation emitted from the primary light engine (20); a projector lens (28) configured to project at least a portion of the reflected electromagnetic radiation from the reflector (28); and a shutter (24, 24*a-c*) disposed between the secondary light engine (22) and the reflector (28). The shutter (24, 24*a-c*) is configured to selectively obscure a portion of the projector lens (28) from the reflected electromagnetic radiation and is further configured to selectively emit at least a portion of electromagnetic radiation from the secondary light engine (22) through at least a portion of the projector lens (28).

15 Claims, 12 Drawing Sheets

(56) References Cited

U.S. PATENT DOCUMENTS

| | | | |
|---|---|---|---|
| 7,607,811 B2* | 10/2009 | Okada | 362/545 |
| 8,342,726 B2* | 1/2013 | Fischer et al. | 362/521 |
| 2004/0228137 A1 | 11/2004 | Mensales et al. | |
| 2004/0228139 A1* | 11/2004 | Taniuchi | 362/539 |
| 2004/0240221 A1 | 12/2004 | Choi | |
| 2005/0073853 A1 | 4/2005 | Stam | |
| 2006/0002128 A1 | 1/2006 | Suzuki et al. | |
| 2007/0201241 A1 | 8/2007 | Komatsu | |
| 2008/0037269 A1 | 2/2008 | Sugiyama et al. | |
| 2008/0037270 A1 | 2/2008 | Kagiyama | |
| 2008/0062709 A1* | 3/2008 | Mochizuki et al. | 362/539 |
| 2008/0112180 A1* | 5/2008 | Okada | 362/518 |
| 2009/0097269 A1 | 4/2009 | Stauss et al. | |
| 2009/0213608 A1* | 8/2009 | Mozaffari-Afshar et al. | 362/520 |

OTHER PUBLICATIONS

Abstract of DE 103 47 951 pub'd on EPO espacenet database (1 page text).

* cited by examiner

US 8,905,609 B2

LIGHTING SYSTEM WITH SHUTTER, REFLECTOR, PRIMARY LIGHT ENGINE AND A SECONDARY LIGHT ENGINE COUPLED TO SHUTTER

STATEMENT REGARDING FEDERALLY SPONSORED RESEARCH OR DEVELOPMENT

N/A

TECHNICAL FIELD

The present application relates to lighting systems and more particularly to lighting systems including daytime running lights.

BACKGROUND

Lighting systems (such as headlights) are well-known and are used in a wide variety of applications, including automotive applications. In general, a lighting system includes one or more projector apparatus for emitting light distinct patterns. For example, a lighting system may emit light in a low-beam mode in which light is generally emitted below the horizon. The lighting system may also emit light in a high beam mode in which light is generally emitted above and below the horizon. Recently, lighting systems have also begun to emit light in a daytime running lights (DRL) mode in order to increase the visibility of the vehicle during daylight conditions. In a DRL mode, light is emitted above and below the horizon, however, the light is typically emitted at a lower overall output compared to either the low and/or high beam modes (for example, in order to comply with SAE regulations or ECE specifications). Examples of such lighting system may be found in U.S. Pat. No. 7,316,492 (Yamamura), U.S. Patent Pub. No. 2009/0097269 (Stauss); U.S. Patent Pub. No. 2004/0240221 (Choi); U.S. Patent Pub. No. 2006/0002128 (Suzuki); U.S. Patent Pub. No. 2004/0228137 (Mensales); U.S. Patent Pub. No. 2008/0037269 (Sugiyama); U.S. Patent Pub. No. 2005/0073853 (Stam); U.S. Patent Pub. No. 2008/0037270 (Kagiyama); U.S. Pat. No. 6,467,940 (Eschler); and U.S. Pat. No. 6,976,772 (Albou).

In many applications, it may be desirable for the low and/or high beam mode to utilize a halogen lamp or a high-intensity discharge (HID) light source. Unfortunately, it is generally not possible to operate HID light sources at reduced voltages (power) compared to their designed, steady-state operating voltages. Similarly, while it may be possible to operate halogens at reduced power levels, halogens are typically not very efficient below their designed, steady-state operating powers, particularly ECE specifications due to the high dimming ratio necessary. One approach to address these issues has been to provide a separate, dedicated lighting apparatus designed to function only in the DRL mode. Unfortunately, such an approach increases the costs since two lighting apparatus must be provided for each side of the vehicle. In addition, operating a single lighting source in both DRL mode as well as low/high beam mode may significantly shorten the lifespan of the lighting source since the light source would be operating continuously while the vehicle is running.

BRIEF DESCRIPTION OF THE DRAWINGS

Reference should be made to the following detailed description which should be read in conjunction with the following figures, wherein like numerals represent like parts.

DETAILED DESCRIPTION

In general, the present disclosure may comprise a lighting system (for example, but not limited to, a lighting system for an automobile or the like) comprising a single projector apparatus having a primary and a secondary light engine in which the primary light engine functions in a first lighting mode (e.g., a low beam and/or high beam mode) and the secondary light engine functions in second mode (e.g., a daytime running light (DRL) mode). The single lighting apparatus may therefore integrate two light sources into the lighting apparatus to achieve a DRL mode (as well as low and/or high beam mode) within the same package.

Figure 1:
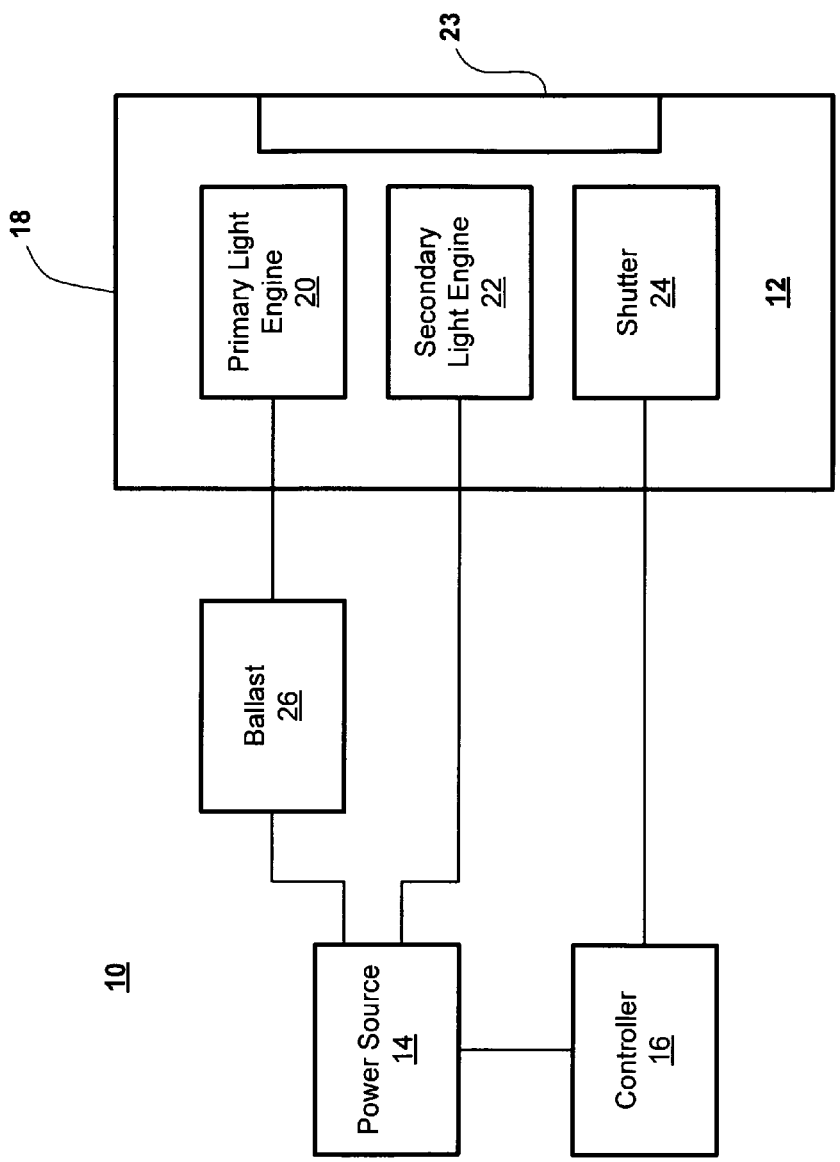
FIG. 1 diagrammatically illustrates a lighting system consistent with at least one embodiment of the present disclosure.

Turning now to FIG. 1, one embodiment of a lighting system 10 consistent with the present disclosure is generally illustrated. The lighting system 10 may comprise at least one projector system 12, a power source 14, and a controller 16. The projector system 12 may comprise a housing 18, a primary light engine 20, a secondary light engine 22, and a shutter 24. The housing 18 may be configured to receive at least a portion of the primary light engine 20, the secondary light engine 22, and/or the shutter 24. The housing 18 may also include one or more lenses 23, such as reflector and/or projector lens as discussed herein.

The projector system 12 may receive an electrical input from the power source 14, for example, to energize the primary light engine 20, secondary light engine 22, and/or the shutter 24. The power source 14 may comprise a DC and/or AC power source, and may optionally include one or more inverters, converters, and/or power conditioners. Optionally, one or more ballast circuits 26 may receive an electrical input from the power source 14 and convert it to a stable output for driving the projector system 12. One or more of the ballast circuits 26 may be positioned remotely from the projector system 12 or may be integral with or coupled directed to the housing 18 of the projector system 16.

The controller 16 may transmit one or more signals to control the operation of the lighting system 10. For example, the controller 16 may transmit a signal to the power source 14 in order to selectively energize the primary light engine 20 and/or the secondary light engine 22. The controller 16 may also transmit a signal to the shutter 24 to selectively control the position of the shutter 24 as discussed herein. The controller 16 may receive an input signal generated under the control of a user and/or generated from one or more sensors such as, but not limited to, an ambient light sensor or the like (not shown) and/or from another computer system (such as, but not limited to, a vehicle electronic control system (ECU)).

Figure 2:
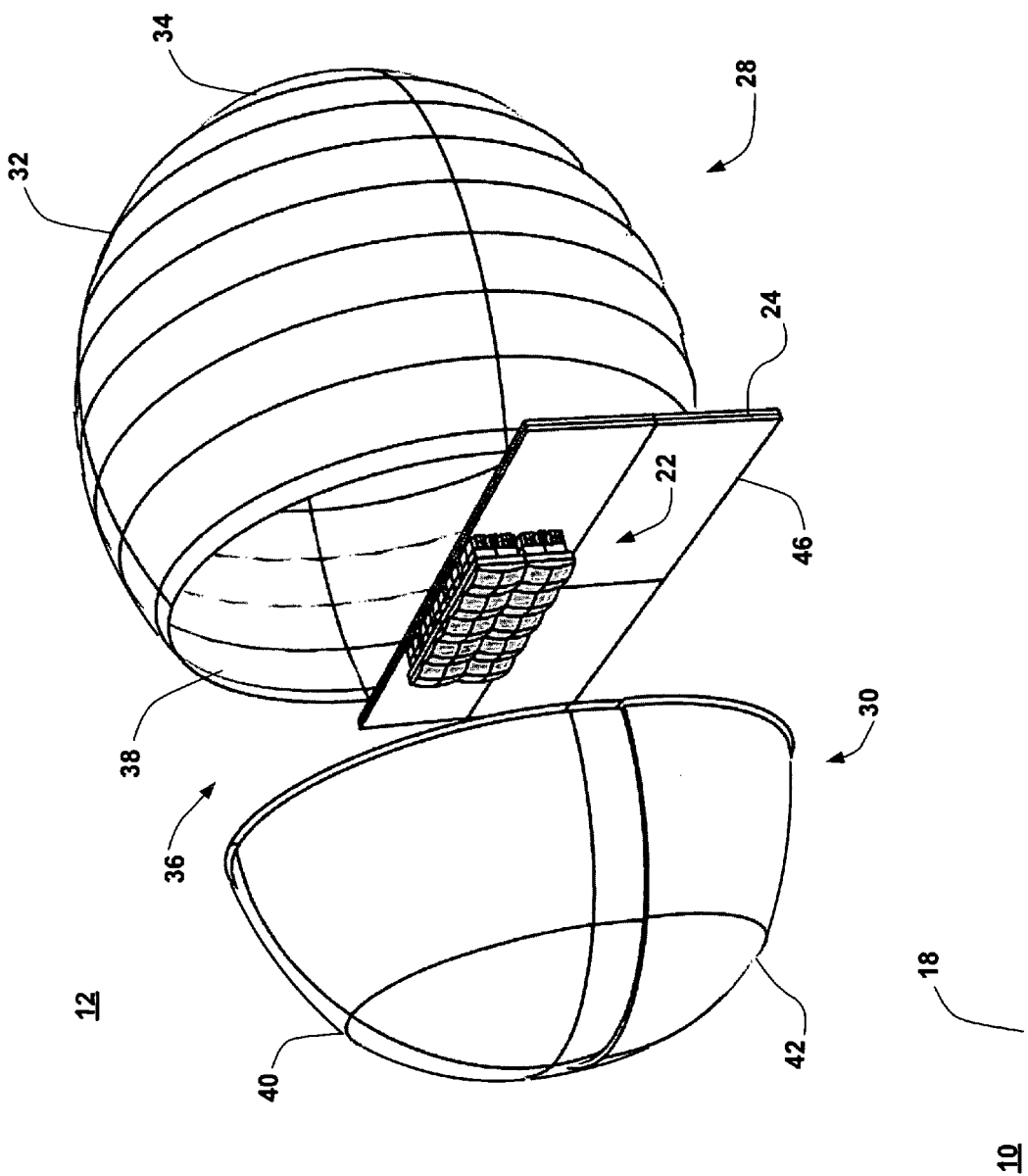
FIG. 2 is a partial perspective view illustrating one embodiment of a projector apparatus in a first position consistent with the present disclosure.
Figure 3:
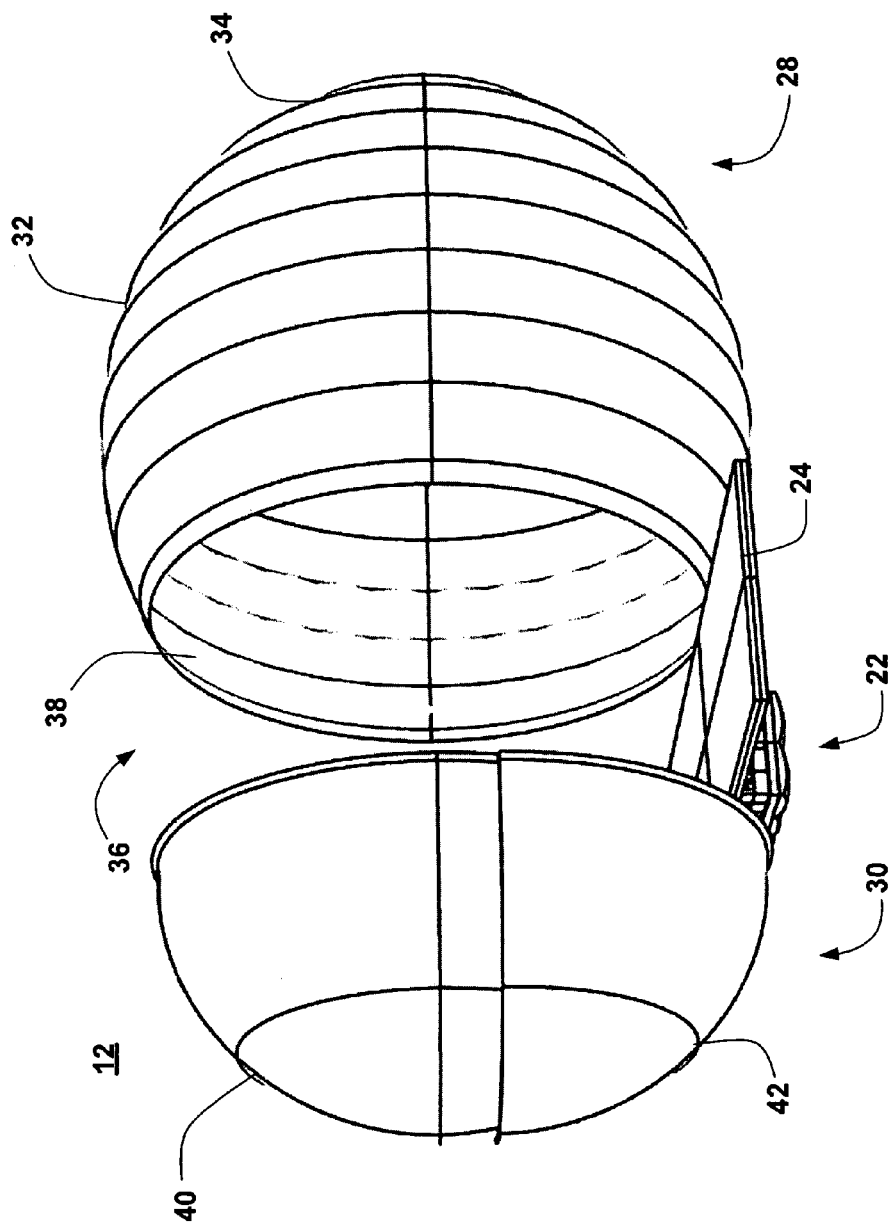
FIG. 3 is a partial perspective view illustrating one embodiment of a projector apparatus in a second position consistent with the present disclosure.

Turning now to FIGS. 2 and 3, an exploded view of one embodiment of the projector apparatus 12 is generally illustrated (the housing 18 is not shown for clarity). As can be seen, the projector apparatus 12 may comprise the primary light engine 20 (not shown for clarity), the secondary light engine 22, at least one reflector 28, at least one projector lens 30, and the shutter 24 which is moveable between at least a first position (as generally illustrated in FIG. 2) and a second position (as generally illustrated in FIG. 3).

The reflector 28 may be configured to receive electromagnet radiation generated from the primary light engine 20. For example, the reflector 28 may include a reflector cup 32 including an opening 34 configured to receive at least a portion of the primary light engine 20, the light emitted therefrom, or one or more electrical leads therefor; an open end 36 from which electromagnet radiation emitted by the primary light engine 20 may be cast from the projector apparatus 12; and an interior surface 38 configured to reflect light from the primary light engine 20 toward the open end 36. The phrase "reflector cup" thus includes, but is not limited to known parabolic, elliptical and sphero-elliptical reflector configurations including those with faceted interior surfaces as well as truncated reflector cups. The phrase "truncated reflector cup" means a portion of a reflector cup, as may be realized, for example, by dividing a reflector cup along a plane intersecting the longitudinal axis (e.g., intersecting a first end and a second end). A truncated reflector cup may thus be configured as one-half of a reflector cup, but may be more or less than half of a reflector cup. For example, a truncated reflector cup may have a semi-parabaloid or semi-elipsoid shape.

The projector lens 30 may be configured to emit electromagnetic radiation, generated from the primary and/or secondary light engines 20, 22, in one or more distribution patterns. For example, the projector lens 30 may be configured to distribute electromagnetic radiation in a first distribution pattern in which the electromagnetic radiation is emitted from the projection apparatus 10 substantially at and/or below the horizon. The projector lens 30 may also be configured to distribute electromagnetic radiation in a second distribution pattern in which the electromagnetic radiation is emitted from the projection apparatus 10 above and below the horizon. As used herein, the phrase "at and/or below the horizon" means the electromagnetic radiation emitted from the projector lens 30 is emitted generally parallel to ground and/or downwardly from the projector apparatus 10 and towards the ground and the phrase "below the horizon" means the electromagnetic radiation emitted from the projector lens 30 is emitted generally downwardly from the projector apparatus 10 and towards the ground. In addition, as used herein, the phrase "above and below the horizon" means the electromagnetic radiation emitted from the projector lens 30 is emitted generally downwardly from the projector apparatus 10 and towards the ground and generally upwardly from the projector apparatus 12 and away from the ground.

For example, the projector lens 30 may comprise an aspheric or aspherical lens. According to one embodiment, the projector lens 30 may include an upper partial projector lens 40 and a lower partial projector lens 42. The upper and/or lower partial projector lenses 40, 42 may include, but is not limited to, known parabolic, elliptical and sphero-elliptical configurations, conic sections (such as, but not limited to, paraboloids, hyperboloids, and ellipsoids) as well as higher-order aspherics. Higher-order aspherics mean surface departures from conic, which are proportional to $r^4$, $r^6$, $r^8$, $r^{10}$, and so on, where r is the radial distance from the optical axis.

Figure 4:
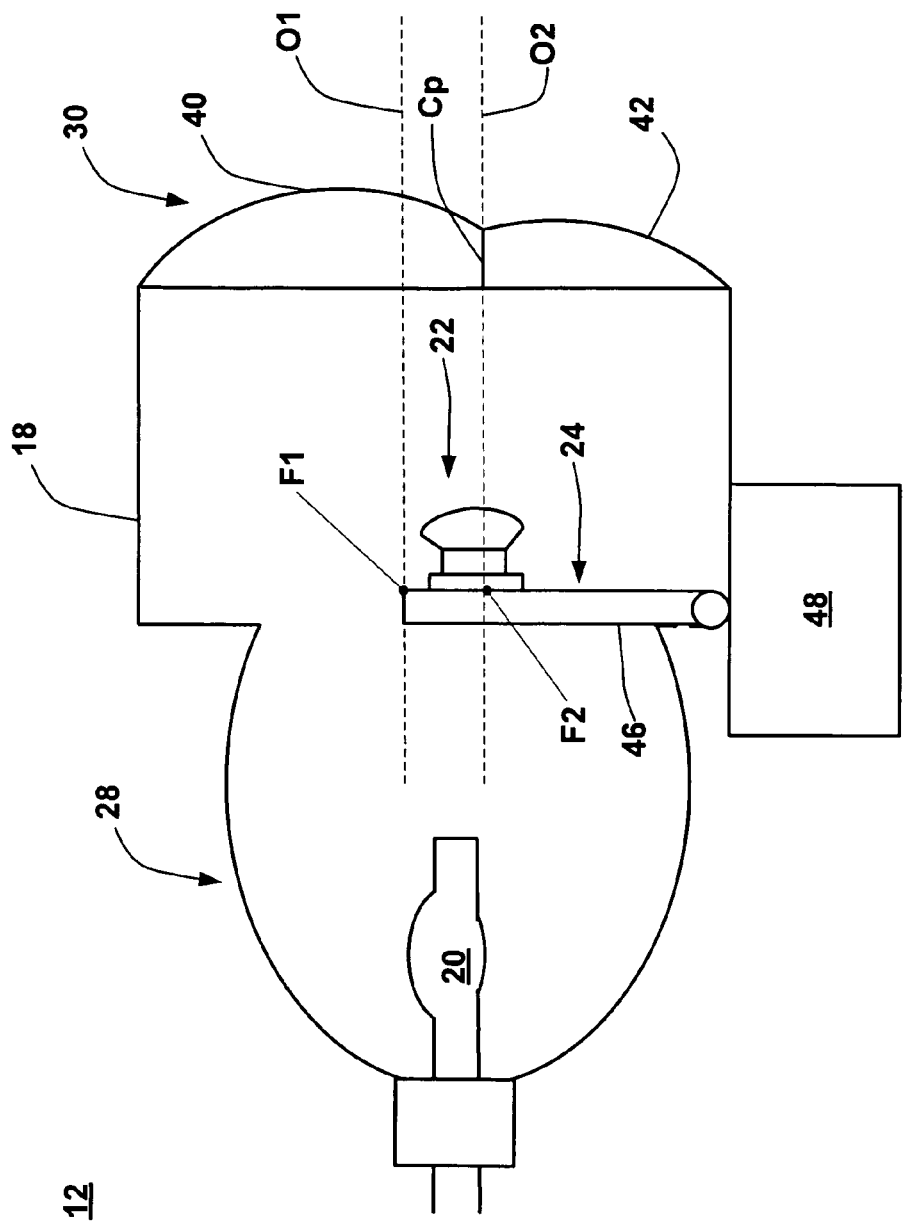
FIG. 4 is a side cross-sectional view diagrammatically illustrating an embodiment of the projector apparatus of FIG. 2.

Referring now to FIG. 4, a cross-sectional view of one embodiment illustrating the projector lens 30 is shown. In particular, the upper partial projector lens 40 may include a portion of an aspheric lens that having an optical axis O1 with its focus F1 on the upper edge 44 of the shutter 24. The lower partial projector lens 42 may also include a portion of an aspheric lens having an optical axis O2 with its focus F2 either in the center or below the center of the secondary light engine 22. The axis of the lower partial projector lens may be the cut plane $C_p$ for both the upper and lower partial projector lenses 40, 42. Both the upper and lower partial projector lenses 40, 42 may have the same focal lengths. Of course, this is merely one exemplary embodiment of the projector lens 30, and other configurations are within the scope of the present disclosure.

The specific arrangement, shape and contour of the reflector 28 and the projector 30 will depend on the specific application of the projector apparatus 12 and may include (but is not limited to) such factors as the overall size constraints on the projector apparatus 12, desired aesthetic appearance of the projector apparatus 12, as well as the desired electromagnetic radiation output of the projector apparatus 12. The projector apparatus 12 may be useful as an automotive headlight, tail light, and/or signal light, a marine light, an aircraft light, a recreational vehicle light, or other application for which two or more electromagnetic radiation distribution patterns are desired.

The shutter 24 may be provided to change the distribution pattern. In particular, the shutter 24 may be configured to move between at least a first position (as generally illustrated in FIG. 2) and a second position (as generally illustrated in FIG. 3). While the shutter 24 is shown in two positions (FIGS. 2 and 3), it should be appreciated that the shutter 24 may also be configured to be positioned in other orientations (such as, but not limited to, any position intermediate the first and second positions).

For example, the shutter 24 may include one or more moveable baffle elements 46. For the sake clarity, only a single baffle element 46 is shown; however, more than one baffle element 46 may be provided depending on the application. The baffle element 46 may be coupled to an actuator mechanism 48 as generally illustrated in FIG. 4. The actuator mechanism 48 may include any device for moving the baffle element 46 between the first and second positions. For example, the actuator mechanism 48 may comprise a solenoid and/or motor coupled to baffle element 46 through associated gearing, levers, cams, linkages, pivot arms, or the like, for pivoting the baffle 46. The actuator mechanism 48 may move the baffle element 46 upon receipt of a signal from the controller 16 (FIG. 1) as discussed herein. Alternatively, a user may directly urge the actuator mechanism 48 to move the baffle element 46.

Figure 5:
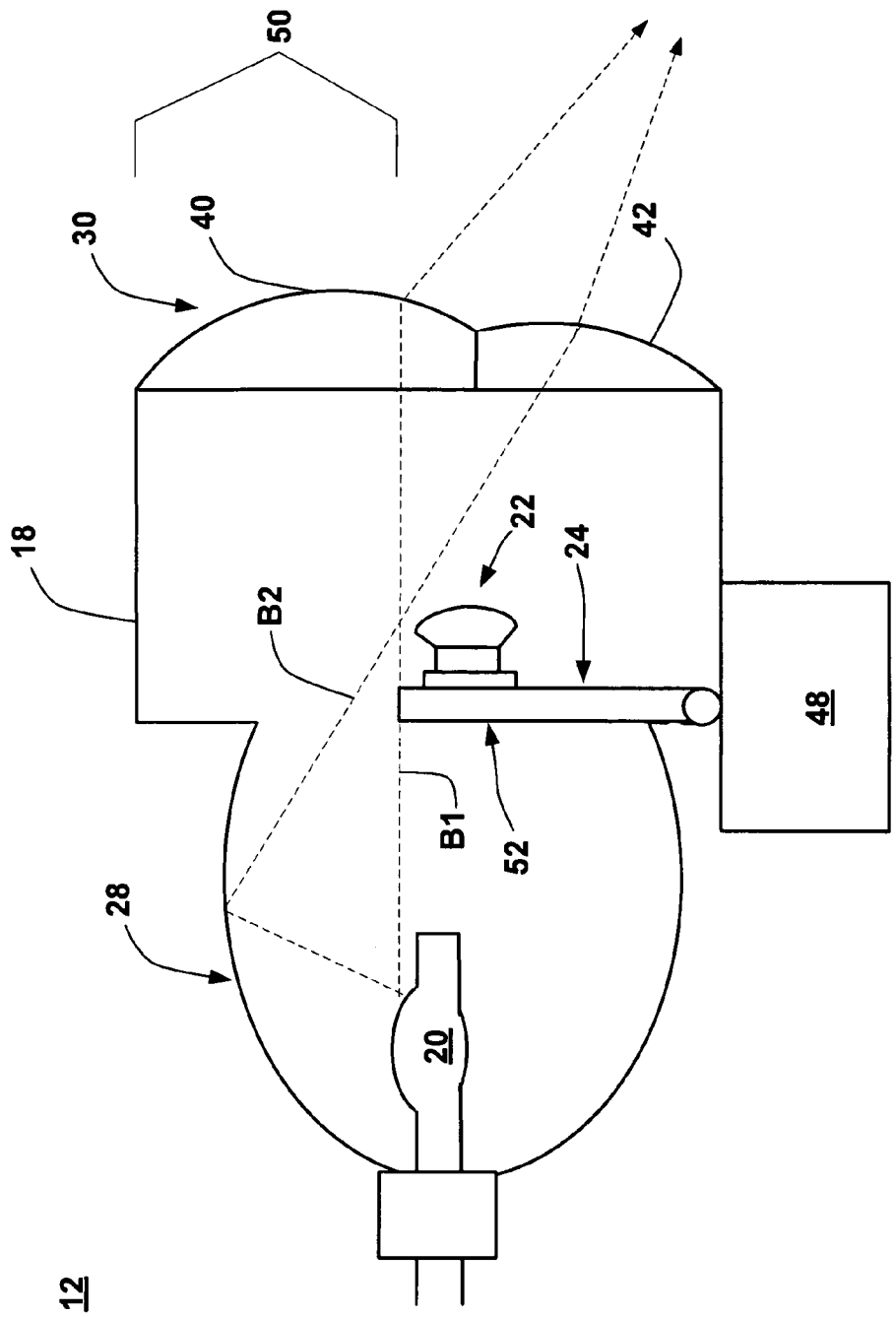
FIG. 5 is another side cross-sectional view diagrammatically illustrating an embodiment of the projector apparatus of FIG. 2 in a low beam mode.

Referring now to FIG. 5, a projector apparatus 12 consistent with the present disclosure comprises a primary light engine 20 including any known light source configuration such as one or more incandescent light source (such as, but not limited to, a halogen lamp), LEDs (with or without a remote phosphor element), a gas discharge light source such as a fluorescent tube (e.g., in a compact fluorescent (CFL) lamp), and/or a high-intensity discharge (HID) light source. While the primary light engine 20 is illustrated as a single light source, the primary light engine 20 may include multiple light sources depending on the application. As used herein, the phrase "primary light engine" is intended to mean a light source which provides the primary or main source of illumination. In contrast, the term "secondary light engine" as used herein is intended to mean a light source which primarily functions to increase the visibility of an object (such as, but not limited to, automobiles, aircraft, marine vessels, as well as other vehicles) to others, particularly during daylight.

According to one embodiment consistent with the present disclosure, the secondary light engine 22 may comprise one or more any known light source configuration including, but not limited to, at least one discharge light source such as a fluorescent tube (e.g., in a CFL lamp), incandescent light source (such as, but not limited to, a halogen lamp), a HID light source and/or LEDs (with or without a remote phosphor element). According to one embodiment, the secondary light engine 22 may be configured to function as a daytime running light (DRL). As used herein, a DRL includes a light emitted from the projector apparatus 12 which increases the visibility/conspicuity of an object (such as, but not limited to, a vehicle) during daylight conditions. The DRL emits electromagnetic radiation which is dimmer than the electromagnetic radiation emitted during operation of a low beam headlight. In addition, the DRL emits electromagnetic radiation both above and below the horizon. The electromagnetic radiation may include, but is not limited to, a white, yellow, amber light.

The secondary light engine 22 may be configured to be disposed within the projector apparatus 12 such that the secondary light engine 22 is between the baffle element 46 and the projector lens 30 and also such that the baffle element 46 is disposed between the secondary light engine 22 and the reflector 28. The secondary light engine 22 may be energized upon receipt of a signal from the controller 16 (FIG. 1). For example, the secondary light engine 22 may be automatically switched on by the controller 16 when a vehicle is turned on and/or moving forward during daylight conditions. The use of separate primary and secondary light engines 20, 22 allows each light engine 20, 22 to operate at a higher efficiency. For example, HID lamps generally cannot be dimmed below their designed steady-state operating voltages (power), and while halogens can be dimmed, they generally do not operate well at voltages (power) well below the designed steady state operating power. The use of a separate and distinct secondary light engine 22 thus allows the projector apparatus 12 to effectively provide a low beam mode (and optionally high beam mode) as well as a DRL mode.

Turning now to FIG. 5, one embodiment of the projector apparatus 12 is illustrated in the low (e.g., regular) beam mode. In particular, the controller 16 (FIG. 1) may transmit one or more signals configured to energize the primary light engine 20 (e.g., but not limited to, a HID lamp) and emit electromagnetic radiation (e.g., illustrated schematically as light beams B1 and B2). For example, the controller 16 may transmit a signal to the power source 14 (also shown in FIG. 1), which may in turn provide the necessary electrical input to the primary light engine 20. The controller 16 may also transmit one or more signals to the shutter 24 to arrange the shutter in a first position. As used herein, the phrase "first position" is intended to mean that at least a portion of the shutter 24 (e.g., the baffle element 46) obscures a portion of the projector lens 30 from the light beams B1, B2 emitted from the primary light engine 20.

For example, when the shutter 24 may be configured to obscure the projector lens 30 from the light beams B1, B2 emitted from the primary light engine 20 when in the first position such that the electromagnetic radiation emitted projector apparatus 12 is distributed at and/or below the horizon. According to one embodiment consistent with the present disclosure, the shutter 24 may be configured to obscure at least a portion 50 of the upper partial projector lens 40 from the primary light source 20 when arranged in the first position. Optionally, the reflector 28 may also be configured to ensure that the light beams B1, B2 emitted from the primary light engine 20, and reflected therefrom, are obscured from the portion 50 of the projector lens 30 when the shutter 24 is in the first position. Additionally, the primary light engine facing surface 52 of the shutter 24 may optionally be reflective to enhance the output from the primary light engine 20 when the shutter 24 is in the first position.

Figure 6:
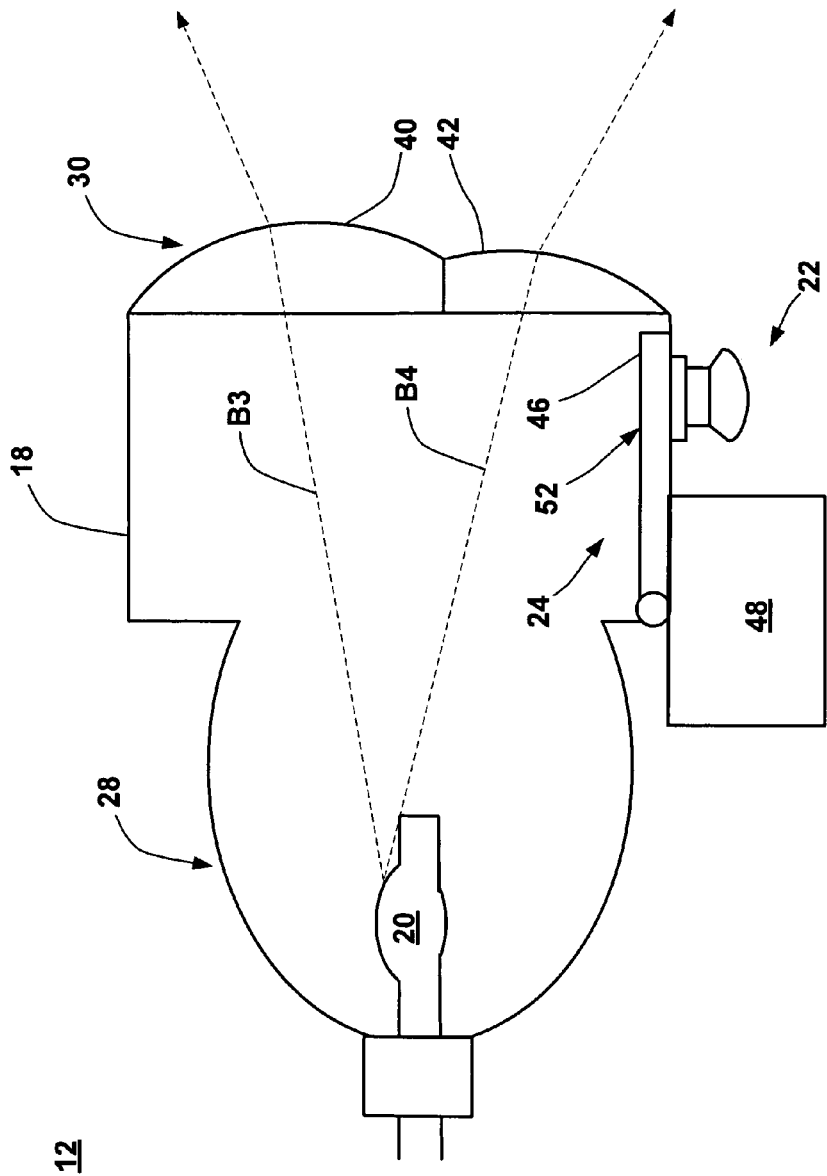
FIG. 6 is another side cross-sectional view diagrammatically illustrating an embodiment of the projector apparatus of FIG. 2 in a high beam mode.

Turning now to FIG. 6, the projector apparatus 12 of FIG. 5 is illustrated in an optional high beam mode. In particular, the controller 16 (FIG. 1) may transmit one or more signals configured to energize the primary light engine 20 and emit electromagnetic radiation (e.g., illustrated schematically as light beams B3 and B4). For example, the controller 16 may transmit a signal to the power source 14 (also shown in FIG. 1), which may in turn provide the necessary electrical input to the primary light engine 20. The controller 16 may also transmit one or more signals to the shutter 24 to arrange the shutter in a second position. As used herein, the phrase "second position" is intended to mean that the electromagnetic radiation (e.g., B3, B4) emitted from the primary light engine 20 may exit the projector lens 30 generally unobstructed. For example, the electromagnetic radiation (e.g., B3, B4) emitted from the primary light engine 20 may exit both the upper and lower partial portions 40, 42 of the projector lens 30 when the shutter 24 is in the second position such that the electromagnetic radiation emitted projector apparatus 12 is distributed at and/or below the horizon. Thus, the shutter 24 (e.g., the baffle element 46) generally does not obscures any portion of the projector lens 30 from the light beams B3, B4 emitted from the primary light engine 20.

Figure 7:
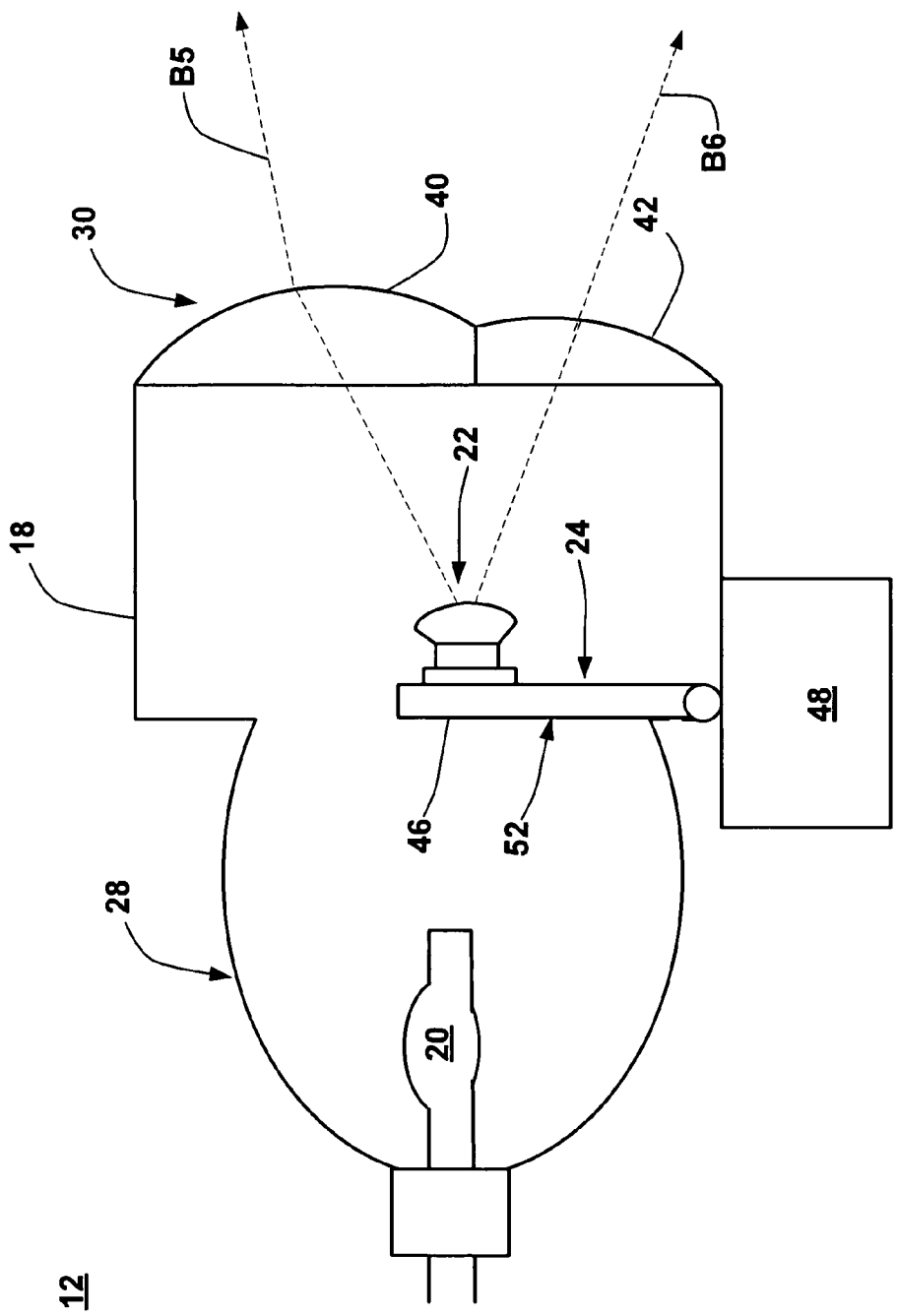
FIG. 7 is another side cross-sectional view diagrammatically illustrating an embodiment of the projector apparatus of FIG. 2 in a daytime running light (DRL) mode.

Referring now to FIG. 7, the projector apparatus 12 of FIG. 5 is illustrated in a DRL mode. In particular, the controller 16 (FIG. 1) may transmit one or more signals configured to energize the secondary light engine 22 and emit electromagnetic radiation (e.g., illustrated schematically as light beams B5 and B6). For example, the controller 16 may transmit a signal to the power source 14 (also shown in FIG. 1), which may in turn provide the necessary electrical input to the secondary light engine 22. The controller 16 may also transmit one or more signals to the shutter 24 to arrange the shutter in the first position. The shutter 24 may be configured to emit at least a portion of the electromagnetic radiation (e.g., B5, B6), generated by the secondary light engine 22, through the projector lens 30. For example, the shutter 24 may be configured to emit at least a portion of the electromagnetic radiation B5, B6, generated by the secondary light engine 22, through the upper and lower partial portions 40, 42 of the projector lens 30 such that the electromagnetic radiation B5, B6 is emitted above and below the horizon.

Figure 8:
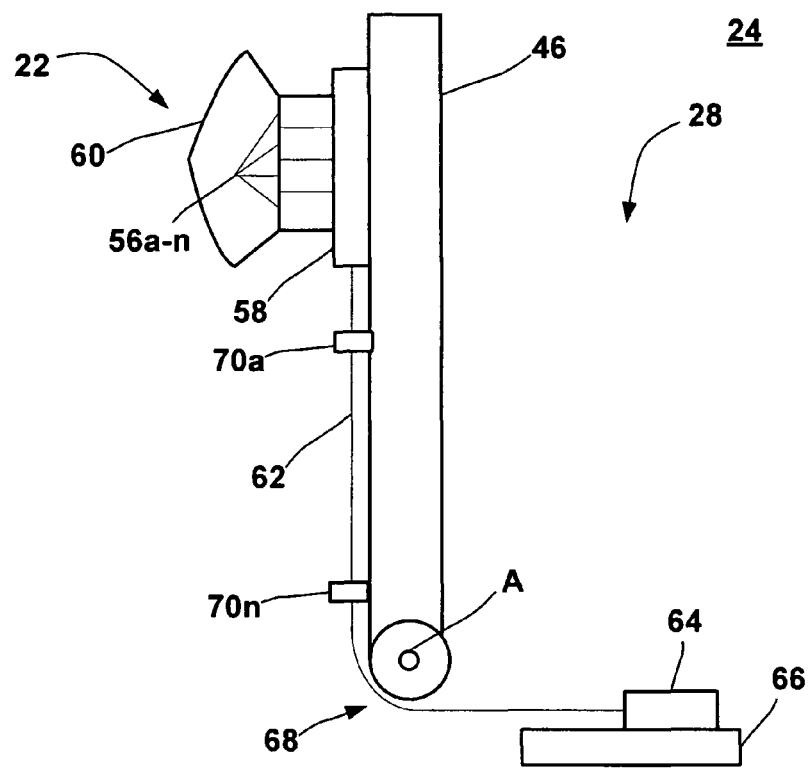
FIG. 8 is a side view of a portion of the shutter shown in FIG. 2 in a first position.
Figure 9:
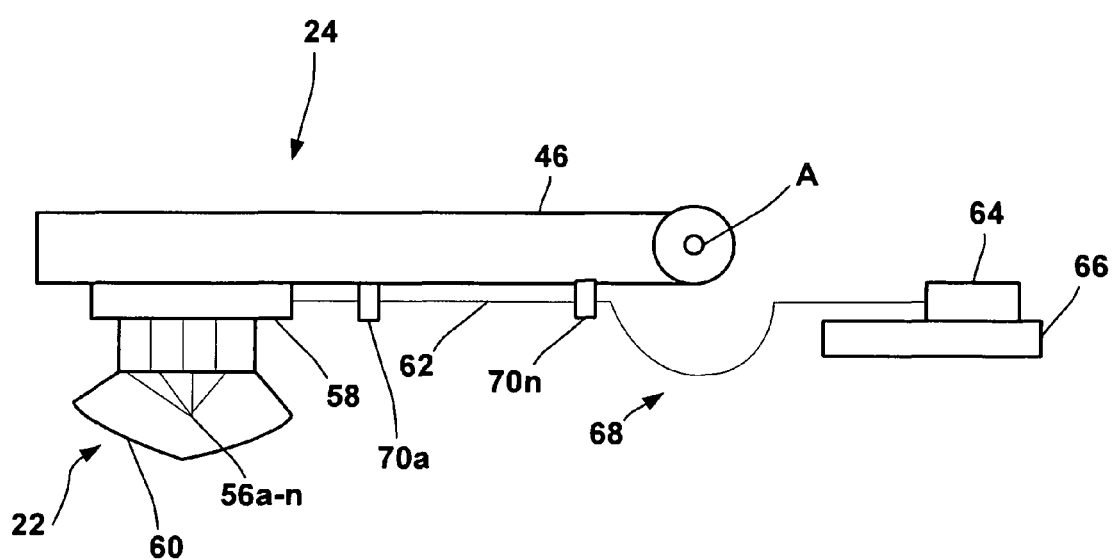
FIG. 9 is a side view of a portion of the shutter shown in FIG. 2 in a second position.

According to one embodiment, the secondary light engine 22 may be coupled to the baffle element 46 such that the secondary light engine 22 moves with the baffle element 46 as the shutter 24 moves between the first and second positions. Referring now to FIGS. 8 and 9, a close-up of the shutter 24 is shown in the first position (FIG. 8) and the second position (FIG. 9). The secondary light engine 22 may comprise one or more LEDs 56a-n (with or without a remote phosphor element) coupled to one or more base plates 58, which may be configured as printed circuit boards (PCBs) including electronics and/or conductive traces and electrical leads thereon receiving an electrical input and energizing the LEDs 56a-n. The LEDs 56a-n may include a series of chips on a ceramic submount or discrete LED packages, such as, but not limited to, white Dragon LEDs, which are available from the assignees of the present disclosure.

The base plates 58 may be thermally conductive and may be thermally coupled to the baffle element 46, which may be constructed from a material having a high thermal conductance such as, but not limited to, metal, ceramic, and alloys. As a result, the baffle element 46 of the shutter 24 may function as a heat sink for the secondary light engine 22. While it is possible to operate both the primary and secondary light engines 20, 22 simultaneously, it may be necessary to it may be beneficial to operate them serially (i.e., only one light engine at a time), particularly when the secondary light engine 22 is functioning as a DRL. In particular, operating the primary and secondary light engines 20, 22 serially may allow the baffle element 46 to more efficiently function as a heat sink for the secondary light engine 22 generally without consideration of the extra heat load generated by the primary light engine 20. The term "coupled" as used herein refers to any connection, coupling, link, or the like and does not require a direct physical or electrical connection. As used herein, "thermally coupled" refers to such a connection, coupling, link, or the like that allows heat to be transferred from one element to the other thermally coupled element.

Optionally, the secondary light engine 22 may include a dispersion lens 60. The dispersion lens 60 may be configured to emit a larger electromagnetic radiation distribution pattern, which may be needed to achieve the desired wide spread for the DRL mode. In particular, the larger electromagnetic radiation distribution pattern may ensure that a sufficient amount of electromagnetic radiation enters both the upper and lower partial projector lenses 40, 42 in order to achieve the desired amount of electromagnetic radiation above and below the horizon. Similarly, the secondary light source 22 may include a collimating lens rather than a dispersion lens 60, depending on the type of light source used for the secondary light engine 22. Depending on the emission angle of the secondary light engine 22, either a dispersion lens 60 or a collimating lens may be used to either spread or narrow the light emitted by the secondary light engine 22 in order to optimize illumination and collection efficiency of light captured by the projector lens 30. Alternatively (or in addition), the lower partial projector lens 42 may be displaced vertically in order to achieve an even distribution above and below the horizon during DRL mode. For example, the lower partial projector lens 42 may be displaced a few mm (such as, but not limited to, 4 mm). While displacing the lower partial projector lens 42 relative to the upper partial projector lens 40 may vertically stretch emission patterns of the low and high beam modes, the shutter 24 will still produce a sharp cut-off between around the horizon. Any reduction of the hot spot of the low and/or high beam modes may be compensated by the reflector 28 or by a larger projector lens 30.

The shutter 24 may be configured to move about a pivot axis A. Power may be provide to the secondary light engine 22 through wires or flex board 62. For example, the wires 62 may electrically couple the PCB 58 to a connector 64 mounted on a second PCB 66. The wires 62 may be configured to be flexible enough to resiliently bend around the pivot axis A of the shutter 24, and may optionally include a loop 68, best seen in FIG. 9. The loop 68 may be configured to avoid kinks and wear and minimize stress on the wire or flex board 62. Optionally, one or more retainers 70a-n may be provided along the baffle element 46 to retain the wire or flex board 62. While the wire or flex board 62 has been shown on/about an exterior surface of the baffle element 46, it may be appreciated that that the wire or flex board 62 may also be at least partially disposed within the baffle element 46, for example, within a lumen defined by the baffle element 46.

Figure 10:
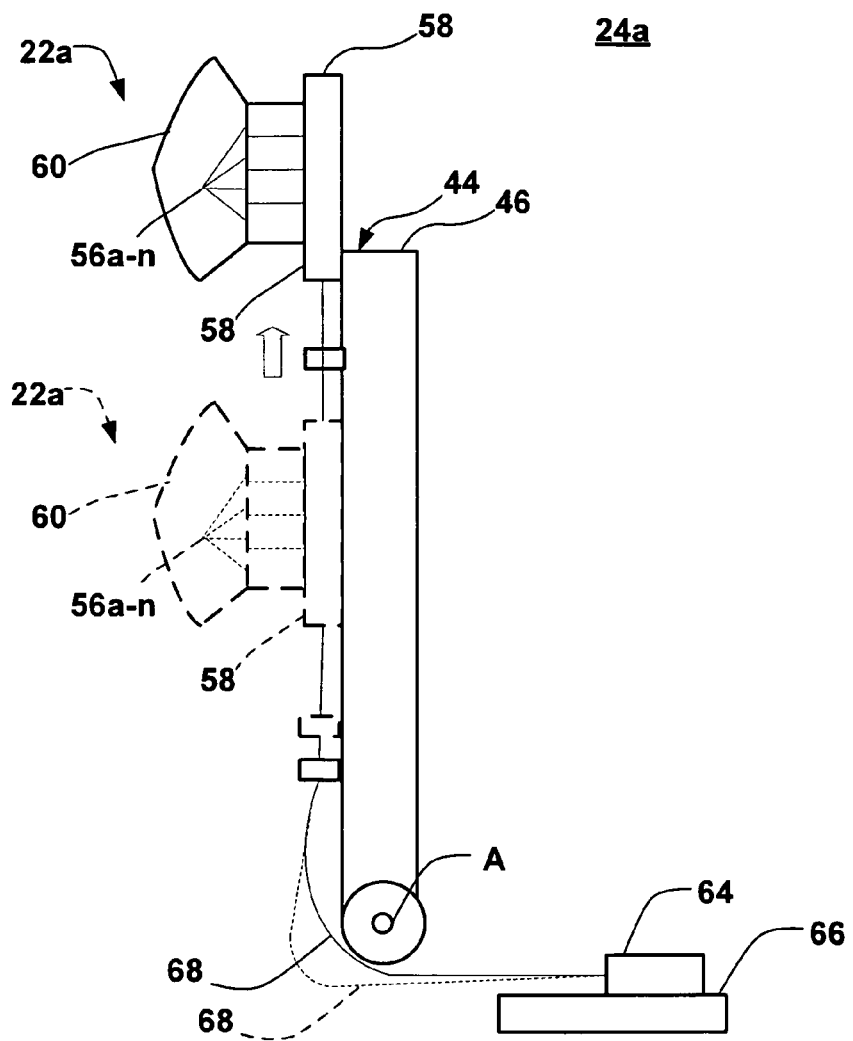
FIG. 10 is a side view of a portion of another embodiment of a shutter shown in a first position consistent with the present disclosure.

Turning now to FIG. 10, another embodiment of a shutter 24a and secondary light engine 22a is shown. In particular, secondary light engine 22a may be moveably coupled to the baffle element 46 and may be used with the projector 30 described herein. The secondary light engine 22a may move from a first position (generally illustrated in dotted lines) to a second position (generally illustrated in solid lines). In the first position, the secondary light engine 22a is below the upper edge 44 of the baffle element 46. The secondary light engine 22a may be arranged in the first position whenever the secondary light engine 22a is not energized. By arranging the secondary light engine 22a below the upper edge 44 of the baffle element 46, the secondary light engine 22a will not interfere with or block radiation emitted from the primary light engine 20.

In contrast, the secondary light engine 22a may be arranged in the second position whenever the secondary light engine 22a is energized (e.g., during DRL mode). By moving the secondary light engine 22a upwardly in the direction of the arrow towards and/or beyond the upper edge 44 of the baffle element 46, the secondary light engine 22a may be aligned with the One benefit of moveably coupling the secondary light engine 22a onto the baffle element 46 is that may allow the secondary light engine 22a to be aligned with both the first and second optical axis O1, O2 as well their focal points F1, F2, of the upper and lower partial projection lenses 40, 42 (see FIG. 4), thereby ensuring a generally even distribution above and below the horizon.

Figure 11:
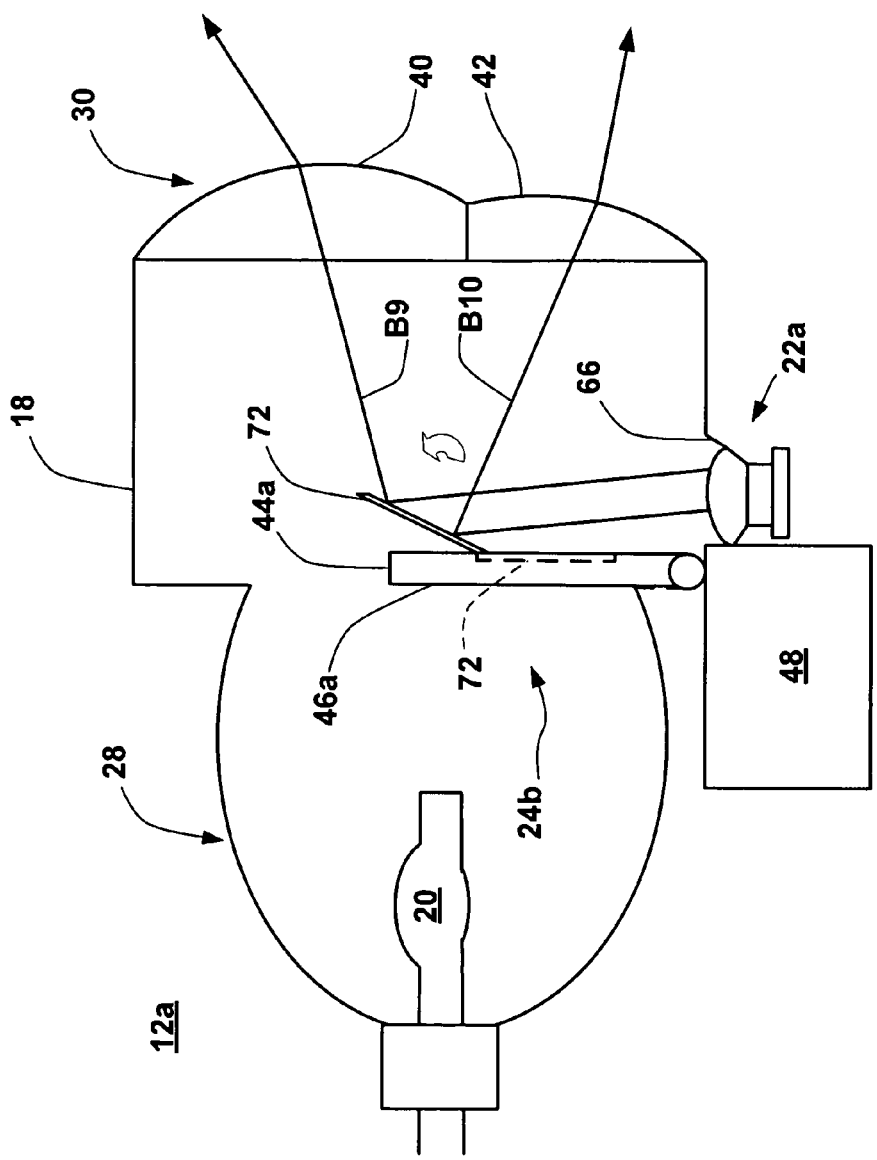
FIG. 11 is a side perspective view of another embodiment of a projector apparatus consistent with the present disclosure.

Turning now to FIG. 11, another embodiment of a projector apparatus 12a is generally illustrated. The projector apparatus 12a may comprise a housing 18a, a primary light engine 20, a secondary light engine 22a, at least one reflector 28, at least one projector lens 30, and a shutter 24b which is moveable between at least a first position and a second position as generally described herein. The shutter 24b may also be configured to emit at least a portion of the electromagnetic radiation generated by the secondary light engine 22a through the projector lens 30. For example, the shutter 24b may be configured to emit at least a portion of the electromagnetic radiation generated by the secondary light engine 22a through the upper and lower partial portions 40, 42 of the projector lens 30 such that the electromagnetic radiation is emitted above and below the horizon when the projector apparatus 12a is in the DRL mode. The projector apparatus 12a may therefore function in a low beam mode (and optionally a high beam mode) as well as a DRL mode as discussed herein.

The secondary light engine 22a may be configured to be disposed within the projector apparatus 12a such that the secondary light engine 22a is between the baffle element 46a and the projector lens 30 and also such that the baffle element 46a is disposed between the secondary light engine 22a and the reflector 28. More specifically, the housing 18a may include an opening 66 configured to receive at least a portion of the secondary light engine 22a, the light (generally illustrated as light beams B7 and B8) emitted therefrom, or one or more electrical leads therefore. The secondary light engine 22a may therefore emit electromagnet radiation B7, B8 which may be reflected by a mirror 72 located on the shutter 24b. The mirror 72 may redirect the electromagnet radiation B7, B8 generated by the secondary light engine 22a and emit the electromagnet radiation B7, B8 through the projector lens 30. For example, the mirror 72 may include a collimating optic (e.g., a parabolic mirror or focusing lens) configured to distribute or spread the electromagnet radiation B7, B8 (if necessary) through the upper and lower partial projector lenses 40, 42 of the projector lens 30 in order to provide a DRL mode.

According to one embodiment, the mirror 72 may be moveably coupled to the baffle element 46a. For example, the mirror 72 may be configured to pivot between an extended position during DRL mode (as shown in solid lines) and a retracted position (as shown in dotted lines) during low beam and/or high beam mode. Of course, the mirror 72 may also be stationary with respect to the baffle element 46a, and the angle of the secondary light engine 22a may be adjusted relative to the mirror 72 in order to ensure the desired light distribution through the projector lens 30.

The secondary light engine 22a may include any known light source configuration such as one or more incandescent light source (such as, but not limited to, a halogen lamp), LEDs (with or without a remote phosphor element), a gas discharge light source such as a fluorescent tube (e.g., in a CFL lamp), and/or a HID light source. While the secondary light engine 22a is illustrated as a single light source, the secondary light engine 22a may include multiple light sources depending on the application.

Figure 12:
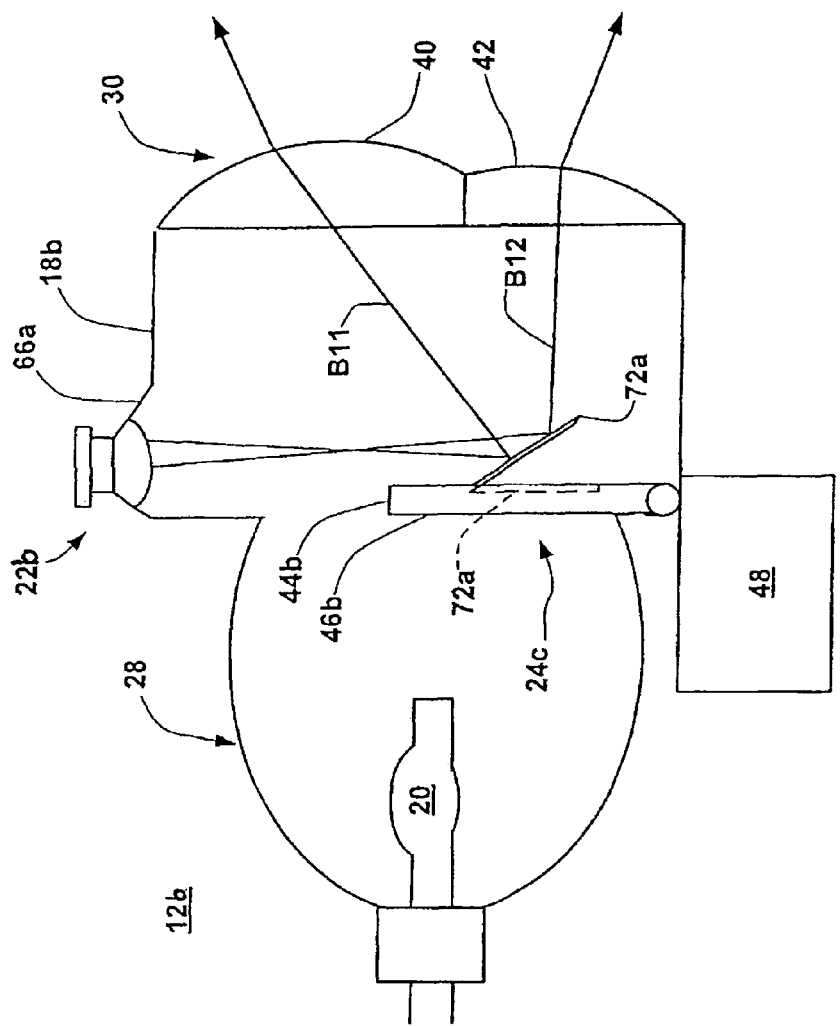
FIG. 12 is a side perspective view of yet another embodiment of a projector apparatus consistent with the present disclosure.

According to yet another embodiment illustrated in FIG. 12, the projector apparatus 12b may be similar to the projector apparatus 12a of FIG. 11 except that the position of the secondary light engine 22b may be altered. For example, the secondary light engine 22b may be arranged above the shutter 24c rather than below as illustrated in FIG. 11. The mirror 72a may function similarly, i.e., the mirror 72a may redirect the electromagnet radiation (e.g., light beams B9, B10) generated by the secondary light engine 22b and emit the light beams B11, B12 through the projector lens 30. The arrangement of FIG. 12 has the advantage that the heat from the secondary light engine 22b can rise from the heat sink, which may help further cool the secondary light engine 22b. This may be particularly beneficial when the secondary light engine 22b is an incandescent light source (such as, but not limited to, a halogen lamp), a gas discharge light source such as a fluorescent tube (e.g., in a CFL lamp), and/or a HID light source, though it may also be beneficial for LED light sources as well.

Figure 13:
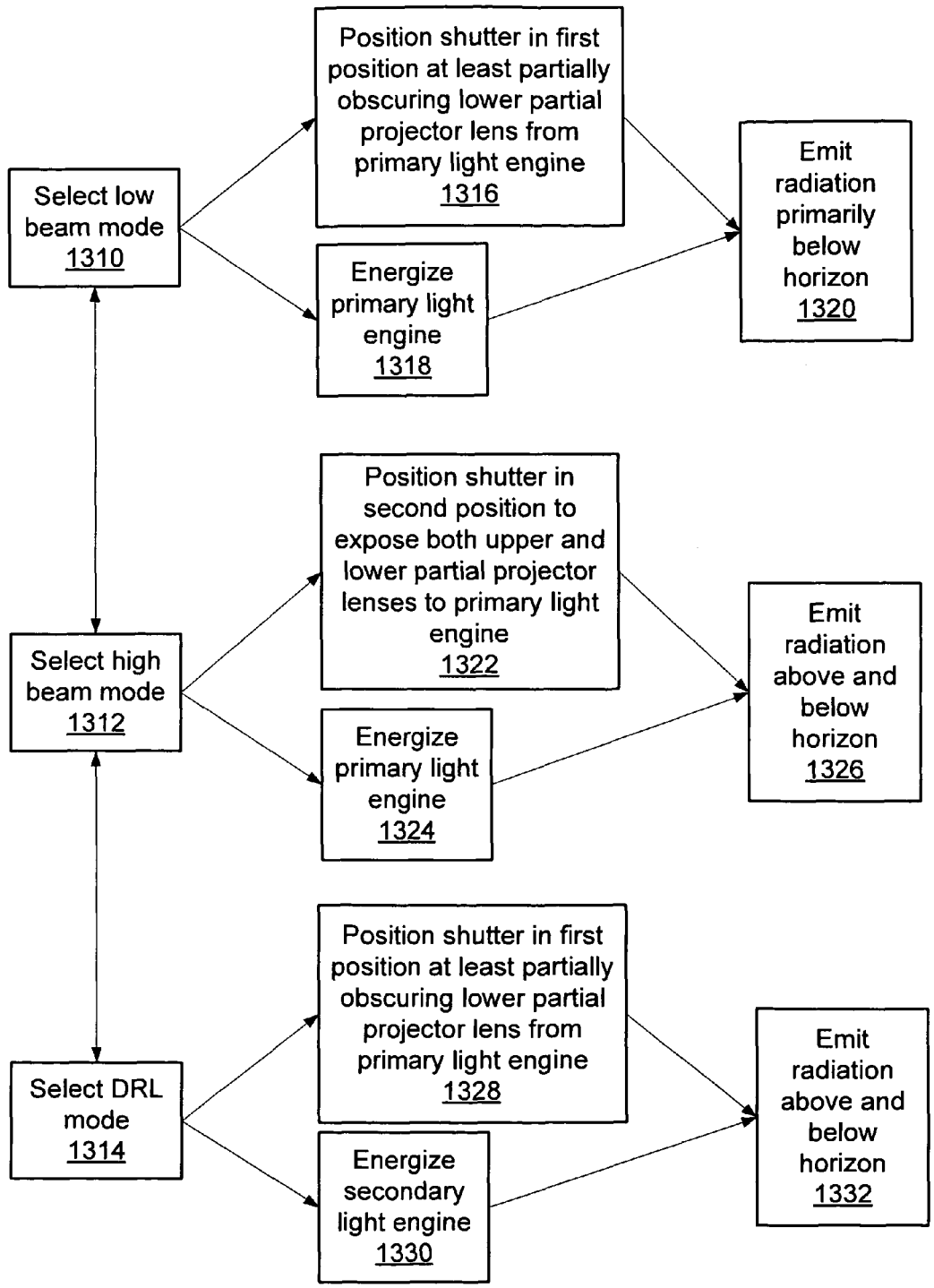
FIG. 13 is a flow chart illustrating one embodiment of a method for operating a lighting system consistent with the present disclosure.

Turning now to FIG. 13, one embodiment of a method 1300 of operating a lighting system 10 consistent with the present disclosure is generally illustrated. In particular, one or more modes of operation may be selected, acts 1310, 1312, 1314. As may be appreciated, any one of the modes of operation may be selected in any order. In general, the upper partial projector lens 40 of the projector lens 30 may be designed to create the low and high beam, and the lower partial projector lens 42 of the projector lens 30 may create the DRL beam. However, both the upper and lower partial projector lenses 40, 42 may contribute (at least to some extent) to all the beams as described herein.

For example, a low beam mode may be selected, act 1310. Upon selection of the low beam mode, the shutter 24 may be positioned in a first position wherein the shutter 24 at least partially obscures a portion of the projector lens 30 (e.g., the lower partial projector lens 42) from the primary light engine 20, act 1316. As may be appreciated, the default position of the shutter 24 may be the first position, in which case the position of the shutter 24 may simply be verified. In addition, the primary light engine 20 may be energized to emit electromagnetic radiation, act 1318. The electromagnetic radiation emitted from the primary light engine 20 may be reflected by the reflector 28, and ultimately emitted from the projector lens 30 primarily at and/or below the horizon, act 1320. In the low beam mode, the upper partial projector lens 40 of the projector lens 30 may create the low beam pattern. The lower partial projector lens 42 may be substantially obscured from the primary light engine 20; however, the lower partial projector lens 42 may add some foreground light to the lower part of the beam.

Upon selection of the high beam mode (act 1312), the shutter 24 may be positioned in a second position wherein the projector lens 30 (e.g., the upper and lower partial projector lenses 40, 42) are exposed to the primary light engine 20, act 1322. As may be appreciated, the default position of the shutter 24 may be the second position, in which case the position of the shutter 24 may simply be verified. In addition, the primary light engine 20 may be energized to emit electromagnetic radiation, act 1324. The electromagnetic radiation emitted from the primary light engine 20 may be reflected by the reflector 28, and ultimately emitted from the projector lens 30 primarily above and below the horizon, act 1326. In the high beam mode, the upper partial projector lens 40 of the projector lens 30 may create the high beam pattern and the lower partial projector lens 42 may add some foreground light to the lower part of the beam.

Upon selection of the high beam mode (act 1314), the shutter 24 may be positioned in the second position, act 1328. In addition, the secondary light engine 22 may be energized to emit electromagnetic radiation, act 1330. The electromagnetic radiation emitted from the secondary light engine 22 may be emitted from the projector lens 30 primarily above and below the horizon, act 1332. In the DRL mode, the lower partial projector lens 42 of the projector lens 30 may create the DRL beam pattern, but mostly the center and lower portion of the beam; however, it does create some of the upper part as well. The upper partial projector lens 40 of the projector lens 30 may add light to the upper portion of the beam.

While the primary and secondary light engines have been illustrated herein as a single light source, either or both of the light engines may include multiple light sources depending on the application. For example, either of both of the light engines may include any known light source configuration such as one or more incandescent light source (such as, but not limited to, a halogen lamp), LEDs (with or without a remote phosphor element), a gas discharge light source such as a fluorescent tube (e.g., in a CFL lamp), a HID light source, or any combination thereof. In addition, one or more of the light engines may emit light in the visible spectrum (herein defined as electromagnetic radiation whose wavelength lies within the spectra of 380-700 nm) as well as (or alternatively) invisible UV or IR light (herein defined as electromagnetic radiation whose wavelength lies within the spectra of 320-380 nm for UV and about 700-1600 nm for IR).

Accordingly, the present disclosure may feature a projection apparatus (12, 12a-b) comprising a reflector (28) configured to reflect electromagnetic radiation emitted from a primary light engine (20), a projector lens (30) configured to project at least a portion of the reflected electromagnetic radiation from the reflector (28), and a shutter (24, 24a-c)

disposed between a secondary light engine (22, 22a-b) and the reflector (28). The shutter (24, 24a-c) may be configured to selectively obscure a portion of the projector lens (30) from the reflected electromagnetic radiation. The shutter (24, 24a-c) may be further configured to selectively emit at least a portion of electromagnetic radiation from the secondary light engine (22, 22a-b) through at least a portion of the projector lens (30).

Consistent with another embodiment of the present disclosure, a lighting system (10) may comprise a primary light engine (20); a secondary light engine (22, 22a-b); a projector lens (30), a reflector (28), and shutter (24, 24a-c). The projector lens (30) may comprise an upper partial projector lens (40) and a lower partial projector lens (42). The upper partial projector lens (40) may be configured to project electromagnetic radiation generally below a horizon and the lower partial projector lens (42) may be configured to project electromagnetic radiation generally above the horizon. The reflector (28) may be configured to reflect electromagnetic radiation emitted from the primary light engine (20). The shutter (24, 24a-c) may be disposed between the secondary light engine (22, 22a-b) and the reflector (28) and may be configured to move between a first and at least a second position. In the first position, the shutter (24, 24a-c) may be configured to obscure the lower partial projector lens (42) from the reflected electromagnetic radiation. The shutter (24, 24a-c) may also be further configured to selectively emit at least a portion of electromagnetic radiation from the secondary light engine (22, 22a-b) through the upper partial projector lens (42) and the lower partial projector lens (42). In the second position, the shutter (24, 24a-c) may be configured to allow the reflected electromagnetic radiation from the primary light engine (20) to be emitted from the upper partial projector lens (40) and the lower partial projector lens (42).

Consistent with another embodiment of the present disclosure, a method (1300) of operating a lighting system (10) may comprise selecting (1314) a daytime running light (DRL) mode. In response to selecting the DRL mode, a shutter (24, 24a-c) may be positioned (1328) in a first position at least partially obscuring a lower partial projector lens (42) of a projector lens (30) from a primary light engine (20) and a secondary light engine (22, 22a-b) may be energized (1330). The secondary light engine (22, 22a-b) may be disposed between the shutter (24, 24a-c) and the projector lens (30). Radiation generated from the secondary light engine (22, 22a-c) may then be emitted (1332) through an upper partial projector lens (40) and the lower partial projector lens (42) such that the radiation is emitted generally above and generally below a horizon.

The following is a list of reference numeral used in the specification:
- 10 lighting system;
- 12 projector system;
- 14 power source;
- 16 controller;
- 18 housing;
- 20 primary light engine;
- 22 secondary light engine;
- 24 shutter;
- 26 ballast circuits;
- 28 reflector;
- 30 projector lens;
- 32 reflector cup;
- 32 opening;
- 36 open end;
- 38 interior surface;
- 40 upper partial projector lens;
- 42 lower partial projector lens;
- 44 upper edge;
- 46 baffle element;
- 48 actuator mechanism;
- 50 portion;
- 52 primary light engine facing surface;
- 56a-n LEDs;
- 58 base plates;
- 60 dispersion lens;
- 62 wires or flex board;
- 64 connector;
- 66 second PCB;
- 68 loop;
- 70a-n retainers;
- 72 mirror;
- A pivot axis;
- B1-B12 light beams;
- O1, O2 optical axis; and
- F1, F2 focal point.

While the principles of the present disclosure have been described herein, it is to be understood by those skilled in the art that this description is made only by way of example and not as a limitation as to the scope of the present disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A projection apparatus (12, 12a-b) comprising:
a reflector (28) configured to reflect electromagnetic radiation emitted from a primary light engine (20);
a projector lens (30) configured to project at least a portion of said reflected electromagnetic radiation from said reflector (28); and
a shutter (24, 24a-c) disposed between a secondary light engine (22, 22a-b) and said reflector (28), said secondary light engine (22, 22a-b) being coupled to said shutter (24, 24a), said shutter (24, 24a-c) configured to selectively obscure a portion of said projector lens (30) from said reflected electromagnetic radiation, said shutter (24, 24a-c) further configured to selectively emit at least a portion of electromagnetic radiation from said secondary light engine (22, 22a-b) through at least a portion of said projector lens (30), said shutter (24, 24a-c) further being configured to selectively prevent emission of at least a portion of electromagnetic radiation from said secondary light engine (22, 22a-b) through at least a portion of said projector lens (30) when said shutter (24, 24 a-c) is not obscuring said portion of said projector lens (30) from said reflected electromagnetic radiation;
wherein when said shutter (24, 24a-c) is selectively emitting electromagnetic radiation from said secondary light engine (22, 22a-b) through said at least a portion of said projector lens (30), said secondary light engine (22, 22a-b) is disposed below a focal point (F1) of said projector lens (30).

2. The projection apparatus of claim 1, further comprising said primary light engine (20) coupled to said reflector (28).

3. The projection apparatus of claim 2, wherein said primary light engine (20) comprises at least one high intensity discharge (HID) light source.

4. The projection apparatus of claim 2, wherein said primary light engine (20) comprises at least one incandescent light source.

5. The projection apparatus of claim 1, wherein said projector lens (30) comprises an upper partial projector lens (40) and a lower partial projector lens (42), said upper partial projector lens (40) configured to project the reflected electromagnetic radiation to create a first emission distribution from said projection apparatus (12, 12a-b) and said lower partial projector lens (42) configured to project the reflected electromagnetic radiation to create a second emission distribution from said projection apparatus (12, 12a-b).

6. The projection apparatus of claim 5, wherein said first emission distribution comprises electromagnetic radiation emitted generally below a horizon and said second emission distribution comprises electromagnetic radiation emitted generally above said horizon.

7. The projection apparatus of claim 6, wherein said shutter (24, 24a-c) is configured to obscure said lower partial projector lens (42) such that said reflected electromagnetic radiation is projected from substantially only said upper partial projector lens (40).

8. The projection apparatus of claim 6, wherein said shutter (24, 24a-c) is configured to emit said electromagnetic radiation from said secondary light engine (22, 22a-b) through said upper partial projector lens (40) and said lower partial projector lens (42).

9. A projection apparatus (12, 12a-b) comprising:
a reflector (28) configured to reflect electromagnetic radiation emitted from a primary light engine (20);
a projector lens (30) configured to project at least a portion of said reflected electromagnetic radiation from said reflector (28); and
a shutter (24, 24a-c) disposed between a secondary light engine (22, 22a-b) and said reflector (28), said shutter (24, 24a-c) configured to selectively obscure a portion of said projector lens (30) from said reflected electromagnetic radiation, said shutter (24, 24a-c) further configured to selectively emit at least a portion of electromagnetic radiation from said secondary light engine (22, 22a-b) through at least a portion of said projector lens (30), and
further comprising said secondary light engine (22) coupled to said shutter (24, 24a), wherein said shutter (24, 24a) is also configured to selectively position said secondary light engine (22) to emit electromagnetic radiation through said at least a portion of said projector lens (30) when said shutter (24, 24a) is obscuring said portion of said projector lens (30) from said reflected electromagnetic radiation;
wherein when said shutter (24, 24a-c) is selectively emitting electromagnetic radiation from said secondary light engine (22, 22a-b) through said at least a portion of said projector lens (30), said secondary light engine (22, 22a-b) is disposed below a focal point (F1) of said projector lens (30).

10. The projection apparatus of claim 9, wherein said secondary light engine (22) comprises at least one light emitting diode (LED) light source.

11. The projection apparatus of claim 9, wherein said secondary light engine (22) comprises at least one incandescent light source.

12. A lighting system (10) comprising:
a primary light engine (20);
a secondary light engine (22, 22a-b);
a projector lens (30) comprising an upper partial projector lens (40) and a lower partial projector lens (42), said upper partial projector lens (40) configured to project electromagnetic radiation generally below a horizon and said lower partial projector lens (42) configured to project electromagnetic radiation generally above said horizon;
a reflector (28) configured to reflect electromagnetic radiation emitted from said primary light engine (20); and
a shutter (24, 24a-c) disposed between said secondary light engine (22, 22a-b) and said reflector (28), said secondary light engine (22, 22a-b) being coupled to said shutter (24, 24a), said shutter (24, 24a-c) configured to move between a first and at least a second position;
wherein in said first position, said shutter (24, 24a-c) is configured to obscure said lower partial projector lens (42) from said reflected electromagnetic radiation, said shutter (24, 24a-c) further configured to selectively emit at least a portion of electromagnetic radiation from said secondary light engine (22, 22a-b) through said upper partial projector lens (40) and said lower partial projector lens (42);
wherein in said second position, said shutter (24, 24a-c) is configured to allow said reflected electromagnetic radiation from said primary light engine (20) to be emitted from said upper partial projector lens (40) and said lower partial projector lens (42) and to prevent emission of at least a portion of electromagnetic radiation from said secondary light engine (22, 22a-b) through at least a portion of said projector lens (30); and
wherein when said shutter (24, 24a-c) is in said first position, said secondary light engine (22, 22a-b) is disposed below a focal point (F1) of said upper partial projector lens (40).

13. The lighting system of claim 12, wherein said primary light engine (20) comprises at least one high intensity discharge (HID) light source and said secondary light engine (22, 22a-b) comprises at least one light emitting diode (LED) light source.

14. A method (1300) comprising:
selecting (1314) a daytime running light mode comprising:
positioning (1328) a shutter (24, 24a-c) in a first position at least partially obscuring a lower partial projector lens (42) of a projector lens (30) from a primary light engine (20);
energizing (1330) a secondary light engine (22, 22a-b), said secondary light engine (22, 22a-b) disposed between said shutter (24, 24a-c) and said projector lens (30), wherein said secondary light engine (22, 22a-b) is coupled to said shutter (24, 24a); and
disposing said secondary light engine (22, 22a-b) below a focal point (F1) of said upper partial projector lens (40); and
emitting (1332) radiation generated from said secondary light engine (22, 22a-b) through an upper partial projector lens (40) and said lower partial projector lens (42) such that said radiation is emitted generally above and generally below a horizon.

15. A method comprising:
selecting (1314) a daytime running light mode comprising:
positioning (1328) a shutter (24, 24a-c) in a first position at least partially obscuring a lower partial projector lens (42) of a projector lens (30) from a primary light engine (20);
energizing (1330) a secondary light engine (22, 22a-b), said secondary light engine (22, 22a-b) disposed between said shutter (24, 24a-c) and said projector lens (30), wherein said secondary light engine (22, 22a-b) is coupled to said shutter (24, 24a); and
emitting (1332) radiation generated from said secondary light engine (22, 22a-b) through an upper partial projector lens (40) and said lower partial projector lens (42) such that said radiation is emitted generally above and generally below a horizon;

selecting (1310) a low beam mode comprising:
- positioning (1316) said shutter (24, 24*a-c*) in said first position;
- energizing (1318) a primary light engine (20); and
- emitting (1320) radiation from said primary light engine (20) through said upper partial projector lens (40) such that said radiation is emitted generally below said horizon; and selecting (1312) a high beam mode comprising:
- positioning (1322) a shutter (24, 24*a-c*) in a second position;
- energizing (1324) said primary light engine (20); and
- emitting (1326) said radiation generated from said primary light engine (20) through an upper partial projector lens (40) and said lower partial projector lens (42) such that said radiation is emitted generally above and generally below said horizon.

* * * * *